United States Patent [19]
Seckel

[11] Patent Number: 5,315,748
[45] Date of Patent: May 31, 1994

[54] MAKING A KINK IMPEDING HOSE

[75] Inventor: Peter H. Seckel, Montclair, N.J.

[73] Assignee: Plastic Specialties and Technologies, Inc., Ridgefield, N.J.

[21] Appl. No.: 883,887

[22] Filed: May 12, 1992

Related U.S. Application Data

[60] Continuation of Ser. No. 742,455, Aug. 5, 1991, abandoned, which is a continuation of Ser. No. 610,338, Nov. 19, 1990, abandoned, which is a continuation of Ser. No. 542,790, Jun. 25, 1990, abandoned, which is a continuation of Ser. No. 277,881, Nov. 30, 1988, abandoned, which is a division of Ser. No. 228,993, Aug. 5, 1988, Pat. No. 4,867,485.

[51] Int. Cl.⁵ .............................................. B21D 39/00
[52] U.S. Cl. ........................................ 29/507; 29/523
[58] Field of Search ................ 29/234, 235, 237, 457, 29/507, 522.1, 523; 138/109, 119; 285/175, 176, 258, 259

[56] References Cited

U.S. PATENT DOCUMENTS

| | | | |
|---|---|---|---|
| 1,425,148 | 8/1922 | Subers. | |
| 2,562,116 | 7/1951 | Nelson | 285/259 X |
| 2,623,837 | 12/1952 | Butler | 29/507 X |
| 2,634,786 | 4/1953 | Stinchcomb et al. | 29/507 X |
| 2,825,588 | 3/1958 | Howard | 285/258 |
| 2,924,009 | 2/1960 | Mazeika | 29/507 |
| 3,508,587 | 4/1970 | Mauch | 138/119 |
| 3,696,773 | 10/1972 | Morris | 114/54 |
| 3,720,235 | 3/1973 | Schrock | 285/259 X |
| 3,957,054 | 5/1976 | McFarlane | 128/350 |
| 4,131,399 | 12/1978 | Calvet | 417/477 |
| 4,257,422 | 3/1981 | Duncan | 604/266 |
| 4,317,452 | 3/1982 | Russo et al. | 128/350 |
| 4,410,012 | 10/1983 | Redding et al. | 138/121 |
| 4,523,613 | 6/1985 | Fouss et al. | 138/121 |
| 4,579,555 | 4/1986 | Russo | 604/282 |

FOREIGN PATENT DOCUMENTS

| | | |
|---|---|---|
| 1380685 | 10/1963 | France. |
| 54-97813 | 7/1979 | Japan. |
| 62-2390 | 1/1987 | Japan. |
| 766085 | 1/1957 | United Kingdom. |

Primary Examiner—Joseph M. Gorski
Attorney, Agent, or Firm—Wood, Herron & Evans

[57] ABSTRACT

This invention pertains to a method for attaching a coupling to a hose. The method includes providing a hose having longitudinal ribs on is inner circumference, associating a coupling with an end of the hose, and joining the coupling to the hose by performing a deformation operation, wherein the ribs have size, number and hardness limited to what the hose wall thickness and softness can absorb such that no leakage occurs after the deformation operation.

6 Claims, 3 Drawing Sheets

MAKING A KINK IMPEDING HOSE

This application is a continuation of application Ser. No. 07/742,455 filed Aug. 5, 1991 and now abandoned, which is a continuation of application Ser. No. 07/610,338 filed Nov. 5, 1990 and now abandoned, which is a continuation of application Ser. No. 07/542,790 filed Jun. 25, 1990 and now abandoned, which is a continuation of application Ser. No. 277,881 filed Nov. 30, 1989, now abandoned, which is a divisional of application Ser. No. 07/228,993 filed Aug. 5, 1988 and now U.S. Pat. No. 4,867,485.

BACKGROUND OF THE INVENTION

I. Field of Invention

This invention is directed toward the field of hoses, more particularly hoses with coupling connectors at each end carrying pressurized fluids, and most particularly, to a novel garden hose having longitudinally extending internal ribs.

II. Discussion of the Prior Art

Flexible hose has been manufactured for many years, first out of natural rubber and more recently out of petrochemical derivatives such as synthetic rubber, thermo plastic rubbers or plastics. It has been known all along that kink resistance is related to diameter, wall thickness and the material's flexibility.

Kink resistance is inversely Proportional to diameter. The smaller the diameter the greater the flexibility, so the hose will readily bend, and not kink. It is directly related to wall thickness—a heavier wall will resist kinking. Most importantly, it is directly related to the flexibility (elongation) of the material. More flexible materials will bend rather than kink.

Burst strength is also directly related to diameter, wall thickness, flexibility, or, in this case, more correctly the tensile strength of the hose construction.

"Kinking" occurs when the hose is doubled over or twisted. With reference to a kinked hose 2 shown by FIGS. 2 and 13, that side which forms the inside surface 104 of the kink resists compression while that side forming the exterior surface 102 of the kink resists elongation. As a result, the walls of the hose more readily fold upon themselves. A consequence of kinking is that the fluid flow through the hose can be either severely restricted or stopped. Kinking is a nuisance, causing the user to waste time unkinking the hose.

Hoses, such as garden hoses or fuel delivery hoses, were initially made with thick walls to resist pressure However, this made the hose more cumbersome. Subsequently, fiber reinforcements became available. Rubber hoses were wrapped with woven tapes, another outer coating layer was added, and the whole assembly was vulcanized. The fiber reinforcement allowed the total wall thickness to be reduced.

Plastic hoses, derived from Petrochemicals, are typically extruded using soft vinyl thermoplastic. Extrusion manufacturing of hose is a continuous process. Soft vinyl thermoplastic is defined in the art by the degree of its hardness measured with a durometer. Typical durometer measurements for soft vinyl plastic range from 60 to 90 as measured by ASTM method D-2240.

By the time plastic hose came along the use of tapes had been replaced by "knitting" tire cord around the inner core of the hose, followed by the addition of an outer coating. This greatly added to burst strength and, due to the knitting of the fiber, the hose had some flexibility.

A more modern and faster production approach is "wrapped" fiber which is spirally wound around the inner core. Knitted reinforcement allows more elongation because of the inherent ability of the fibers to move and rearrange themselves. Spiral wound hose has straight lines of rigid fiber which restrict elongation thereby enhancing the tendency of that hose to kink.

Extreme kinking occurs when a new coiled garden hose is first used. One end is fastened to the faucet and the user walks with the other end away from the faucet without allowing the coiled hose to untwist. Kinking also occurs due to the routine movements of the user.

Rising prices and the scarcity of petrochemical raw materials has made the manufacture of thick walled hose uneconomical. Consequently hoses are being made with thinner walls, resulting in an increased tendency to kink.

When a thin wall modern hose does kink, water flow is shut off and the user must attempt to unkink it through manual manipulation such as swinging the hose to relax the kink or to walk back to the kink and manually straighten it. Some kinks require the user to walk all the way back to the faucet, shut off the flow thereby releasing the pressure, and unkink the hose. The user is further inconvenienced because he or she must walk back, turn on the water and then proceed to the far end to spray. An even more cumbersome problem arises when the user has already attached a large sprinkler device, such as an oscillating sprinkler to the end, and is forced to untwist the hose with this device attached.

SUMMARY OF THE INVENTION

It is an object of the present invention to provide hose having a plurality of longitudinally extending internal ribs.

Another object of the present invention is to provide hose with connecting couplings at each end, the hose having a plurality of longitudinally extending internal ribs.

Another object of the present invention is to prevent partial or complete occlusion of a hose by means of the longitudinally extending ribs.

Another object of the invention is to provide a ready means of swift and effective attachment of the connector couplings to the ends of such hose during manufacture in spite of the presence of the internal ribs.

Conventional hoses have smooth inner walls. In contrast, hoses made according to the present invention have internal longitudinal ribs. The internal ribs add wall thickness to portions of an inside wall of the hose to reduce kinking. Kinking or compression can stop flow in a conventional hose. For example, if a hose connected to the water supply is running with an open sprinkler at the other end, there is no pressure in the hose. If one steps on a non-pressurized conventional hose it will flatten, thereby stopping the flow. The ribs of the present hose prevent total occlusion of the hose at the site of kinking or compression without substantial loss in overall flow.

The present invention is a hose having longitudinal ribs attached to an inside wall of the hose. The hose may be a garden hose or a hose of different diameter. Typically the garden hose inside diameter ranges from 0.5 to 0.75 inches. The rib cross-section may be of many shapes. Typical shapes are trapezoidal (including square and rectangular) or triangular or rounded. Typically the ribs extend about 0.05 inches to about 0.10 inches from the hose inside wall. Preferably the ribs extend the length of the hose including through the coupling. This is preferable because when making hose by an extrusion process the ribs extend the length of the hose. Furthermore, the number of ribs preferably ranges from 5 to 11, most preferably 7. There is a strong preference for an odd number of ribs. An even number will kink symmetrically and the ribs will then fold so that they fall next to each other. An odd number will produce a random effect.

One advantage of the present invention is that an unexpectedly large volume of water passes through the hose, when the hose is kinked.

Another advantage of the present invention is that the hose tends to more readily unkink when pressurized by the termination of flow at the distal end, i.e., by closing an outflow nozzle.

Another advantage of the present invention is the near total resistance of the ribbed thin walled hose to kinking while pressurized.

Hoses have connectors at each end for attaching the hose to a fluid (i.e. water) supply and to an optional device (sprinkler, etc.) which the hose supplies with fluid. The connectors also serve to link one hose end to another hose end. It was completely unexpected that the connectors could be attached to the ends of the hose over ribbed hose portions without leaking. This unexpected result is very beneficial because it results in the further advantage that not only can a kink resistant hose be easily made with connector couplings, but also that the ribs can be continuous from one end of the hose to the other.

It is advantageous to have continuous ribs from one end of the hose to the other because the inventor found this to be the most convenient way to put ribs into hoses made by an extrusion process. However, the issue became whether the hose ends required reaming out of the ribs prior to attaching connectors to each hose end to provide a functional seal. After making the initial discovery that the ribs prevented flow stoppage due to kinking or compression, the inventor expected to have to ream the ends of the hose so that connectors could be attached (by crimping) which would not leak. Thus he was surprised that reaming was unnecessary under certain circumstances. Accordingly, the present invention may have reamed or unreamed ends.

DESCRIPTION OF THE PREFERRED EMBODIMENTS

Figure 1:
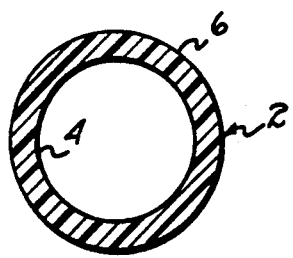
FIG. 1 discloses a cross-sectional view of a smooth walled hose of the prior art perpendicular to the hose longitudinal axis.
Figure 2A:
FIG. 2A discloses a second view of the hose of FIG. 1.
Figure 2B:
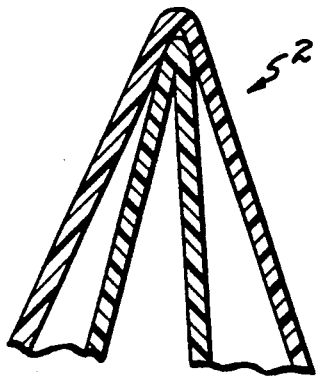
FIG. 2B discloses a schematic view of the hose of FIG. 2A.

Referring to FIG. 1, a conventional smooth bore hose 2 has an outside wall 6 and an inside wall 4. Flow can be stopped by kinking or compressing the hose 2. Typical compressing occurs when someone steps on the hose 2 or it is run over by a car (golf cart, tractor) or piece of gardening equipment. FIG. 2A shows a cross-sectional view of the conventional hose 2 when it is kinked. FIG. 2B shows a schematic view of the kinked hose 2. As FIGS. 2A and 2B show, the flowpath for fluid through the hose is blocked by the kink.

Figure 3:
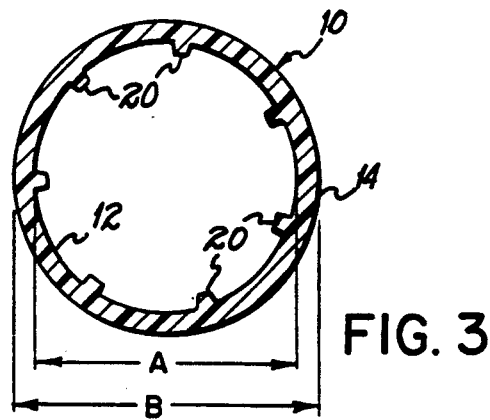
FIG. 3 discloses a cross-sectional view of a first embodiment of the hose of the present invention perpendicular to the hose longitudinal axis.
Figure 4A:
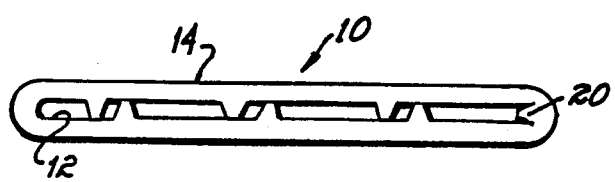
FIG. 4A discloses a second view of the hose of FIG. 3.
Figure 4B:
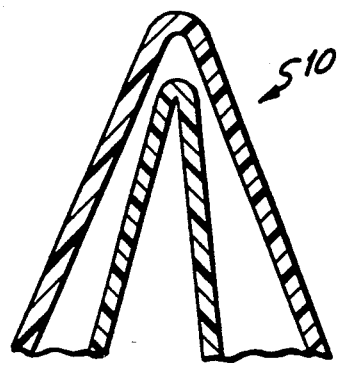
FIG. 4B discloses a schematic view of the hose of FIG. 4A.

FIG. 3 shows a hose 10 made according to the present invention. Hose 10 has an outside wall 14 and an inside wall 12 and includes a plurality of longitudinally displaced ribs 20 either attached to or extruded as part of the hose 10. Hose 10 has an inside diameter A ranging from 0.5 inches to 3.0 inches, preferably ranging from 0.5 inches to 0.75 inches. Hose 10 has an outside diameter B which ranges from 0.6 inches to 3.5 inches, preferably from 0.6 inches to 1.25 inches. The hose has a wall thickness from about 0.04 inches to about 0.15 inches, preferably a thickness between about 0.04 inches and about 0.135 inches excluding rib dimensions. FIGS. 4A and 4B depicts hose 10 when kinked. FIG. 4A shows ribs 20 contacting the opposing inside wall 12. FIG. 4B is a schematic which omits showing the ribs 20 to simplify the Figure. Preferably the ribs 20 are continuous along the length of the hose 10 because when hoses are made by extrusion, the ribs are formed as part of the interior wall.

Because the purpose of the ribs is to prevent the internal walls from touching each other, thereby providing channels for water flow, their size is important, but so is their number. The size of the ribs is restricted by the subsequent crimping procedure used to attach a connecting coupler 52 (FIGS. 9 & 10) to an end of the hose 10. Thus, one must be cognizant of their number. For a typical 0.625 inches (inner diameter) hose, which has a flat internal slit 0.981 inches wide when compressed or kinked, 5 to 11 ribs are preferred and 7 ribs are the most preferred number if they are of the below-described size. An even number will crimp symmetrically, and the ribs will then fold so that they fall next to each other. An odd number will produce a random effect.

Figure 5:
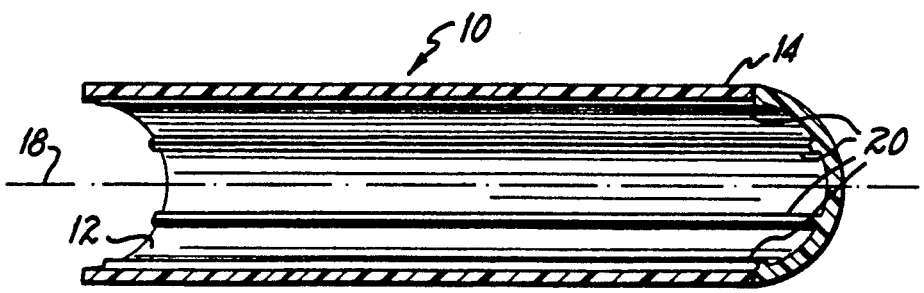
FIG. 5 discloses a longitudinal cross-sectional view of the hose of FIG. 3.

FIG. 5 shows a cross-sectional view of hose 10 having the ribs 20 viewed along a longitudinal axis 18 of the hose 10.

Figure 6:
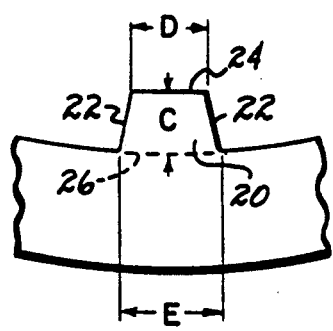
FIG. 6 discloses an enlarged view of a portion of FIG. 4.

FIG. 6 shows rib 20 having a trapezoidal shape formed by top wall 24, base 26 and side wall 22. Rib 20 has a base width E ranging from 0.04 inches to 0.125 inches, a top wall width D ranging from 0.0 inches (as when a trapeziod becomes a triangle as depicted in FIG. 8) to 0.125 inches, and a rib height C ranging from 0.05 inches to 0.10 inches.

Figure 7:
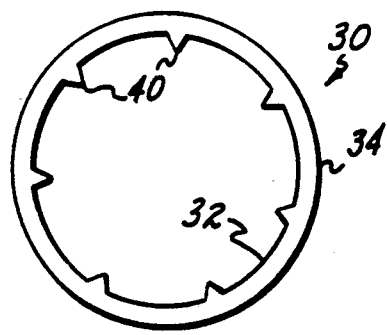
FIG. 7 discloses a cross-sectional view of a second embodiment of the hose of the present invention perpendicular to the hose longitudinal axis.

FIG. 7 shows a second embodiment of the present invention which differs from the first embodiment depicted in FIGS. 3-6 in that the longitudinal ribs have a triangular cross-section. FIG. 7 shows a hose 30 having an outside wall 34, an inside wall 32 and longitudinally displaced ribs 40 having a triangular cross-section. Other cross-sectional shapes such as a rounded shape or square shape could be employed.

Figure 8:
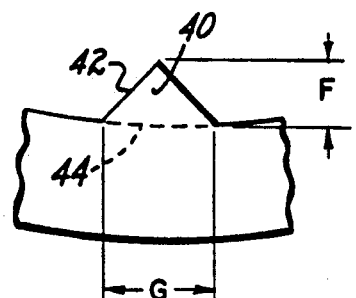
FIG. 8 discloses an enlarged view of a portion of FIG. 7.

FIG. 8 shows rib 40 formed by a base 44 and sidewalls 42. Rib 40 has a base width G ranging from 0.04 to 0.125 inches and a rib height F ranging from 0.05 to 0.10 inches.

Figure 9:
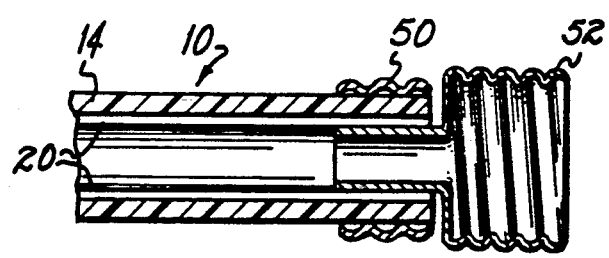
FIG. 9 discloses a cross-sectional view of the present invention with a connecting coupling prior to crimping.
Figure 12:
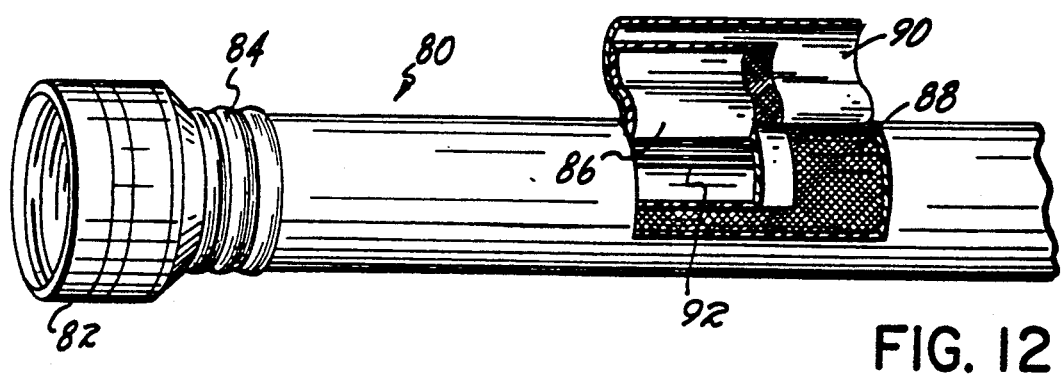
FIG. 12 disclose a fourth embodiment of the present invention.

FIG. 9 shows hose 10 with an external ferrule 50 and a standard male connector 52 inserted into the hose 10 having ribs 20. Other ribs are not shown for simplicity. Hoses typically have an inlet end and an outlet end. The inlet end is provided with a female connector such as a connector 82 (FIG. 12). The outlet end is provided with the male connector 52.

Figure 10:
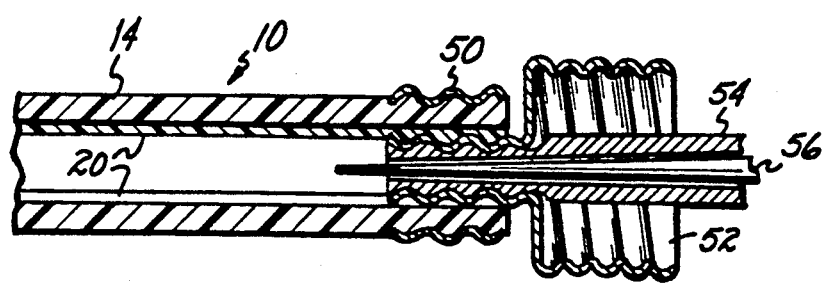
FIG. 10 discloses the apparatus of attaching the connecting coupling to the hose end.

FIG. 10 depicts the crimping procedure used to securely fasten connecting couplings to hose 10. A hardened steel collet 54 is inserted in connector 52, a tapered shaft 56 is driven forward deforming some portion of male connector 52 inside hose 10 in a corrugated pattern and creating a leak proof seal by wed hose 10 between deformed connector 52 and opposingly corrugated ferrule 50. The crimping is done in a corrugated fashion, i.e.,there are areas of greater and lesser compression, thus allowing a better seal of hose material. FIG. 10 also shows that rib 20 is squeezed into the main body of the hose where opposing corrugations exert maximum force. (Other ribs are not shown for simplicity.) Therefore a tight seal is obtained. A female connector 84 (of FIG. 12) is attached in the same way as the male connector 52.

Figure 11:
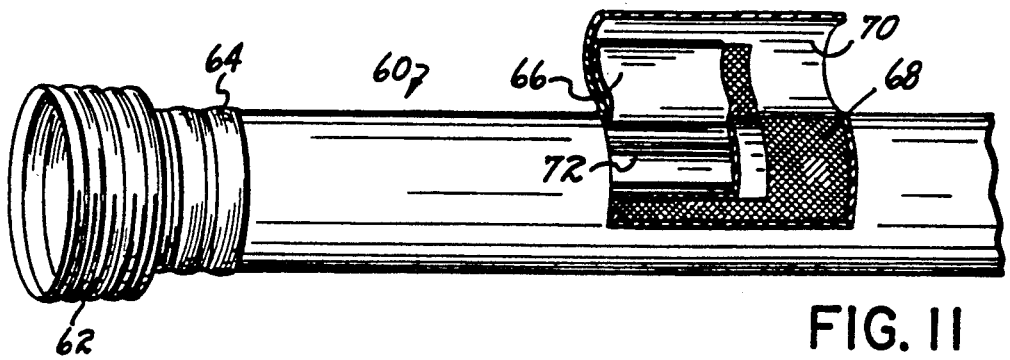
FIG. 11 discloses a third embodiment of the present invention.

FIG. 11 discloses a hose 60 having a male connector coupling 62 and a corrugated ferrule 64, hose 60 has an inner layer (core) 66, spiral wrapped filaments (filament reinforcement) 68 and an outer layer (cover) 70, with longitudinally displaced ribs 72 along the inside.

FIG. 12 discloses a hose 80 having a female connector coupling 82 and a corrugated ferrule 84, hose 80 has inner layer (core) 86, knitted filaments (filament reinforcement) 88 and an outer layer (cover) 90, with longitudinally displaced ribs 92 along the inside.

In a typical 3-ply hose 60, 80 (core 66, 86, filament reinforcement 68, 88, cover 70, 90 are shown by FIGS. 11 and 12, respectively) the ribs 72, 92 are triangularly shaped, between 0.050-0.060 inches high by 0.040-0.050 inches wide at the base The total material thickness (all three layers excluding ribs) is at least 0.080 inches thick and the material stiffness does not exceed 90 durometer. Under these circumstances there is enough soft material backing for the ribs to be squeezed away during crimping.

In addition to the hoses shown in FIGS. 11 and 12 other hoses can have inner cores (inner walls) of up to three plys (thin solid inner wall, foamed center, thin outer skin). Outer covers (outer wall) may have the same type of 3-ply construction.

Figure 13:
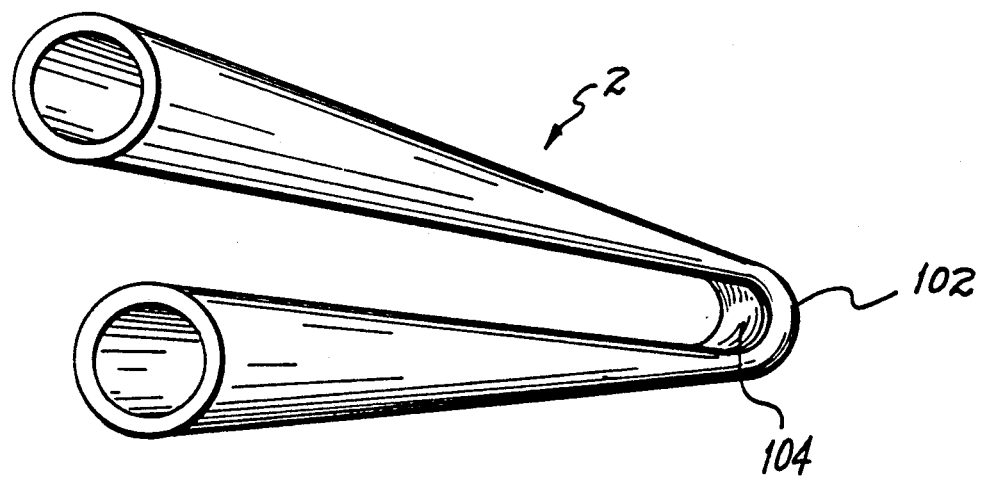
FIG. 13 discloses a perspective view of the hose of FIG. 2B.

FIG. 13 illustrates a kinked prior art hose 2 having a surface 102 outside the kink and a surface 104 forming the inside of the kink.

A hose made according to the present invention is useful for delivering fluids under pressure such as ordinary household water (garden) hoses or fuel delivery hoses. The typical water hose has an outside diameter of about 0.875 inches with an interior diameter of 0.625 inches. Preferably, this hose has longitudinally disposed ribs which are integrally formed on the interior surface of the hose by well known extrusion techniques.

The advantages which flow from the invention include that a hose with such longitudinal ribs resists kinking and, even when kinked, allows an effective amount of water to pass through the kinked section. While the ribs are not large, and even though the kinked hose's internal passage may be almost completely occluded, the flow of fluid through that passage is usually sufficient to allow the user to continue using the hose without attempting to straighten it. This is due to the accelerated flow of water under pressure from one end through the still open passages. Thus substantial flow through a kinked section of hose with these novel ribs is possible, while flow through a kinked section in a conventional, smooth-walled hose is not.

Another aspect of the invention is that the flow through a narrowed passage may actually straighten the hose if a nozzle or other device provides sufficient back pressure to the kinked section. For example, during watering use of a conventional hose the exit end is open and there is reduced pressure in the hose. When the hose is kinked and fully shut off, full pressure develops up to the kink but never beyond. The hose of the present invention, in contrast, permits flow through a kinked hose so there is pressure on both sides of the kink. Thus under full pressure, as when the nozzle, etc. at the hose discharge end is turned off, the hose is fully blown and forced round.

The hose unkinks due to the development of high pressure on each side of the Partial occlusion. Water is usually supplied to a home at pressures ranging from 50 to 120 pounds per square inch (psi). When the exit flow in a 0.625 inch (inner diameter) hose is stopped, for example by a closed spray nozzle, an equal force distributed over 2 inches on both sides of the kink, assuming a pressure of 70 psi, will be on the order of 275 pounds. This force will "round out" the hose causing it to unkink. In contrast, a smooth wall prior art hose will not develop equal pressure on each side of the kink. Thus, water cannot flow past the kink and back pressure down stream from the kink does not develop.

In addition, a hose with such ribs that has been pressurized (i.e., has an open faucet and a closed nozzle), is nearly, if not totally, impossible to kink. In contrast, a pressurized hose lacking such ribs can still kink.

Finally, an unexpected advantage of the invention is the absence of leakage at the end fittings (coupling connectors). Under proper circumstances the presence of the interior ribs can be made as to not interfere with sealing of the fittings. Thus the hose can have connectors attached to the ends of the hose with or without reaming the hose ends to remove the ribs at the hose ends.

The present inventor achieved this very surprising result after trying components and crimping conditions while, frankly, believing it would never work. The inventor was prepared to ream out the ribs at the ends of the hose so that standard industry parts and practices could be used.

The hose wall typically is 0.100 inches thick; addition of the ribs adds 0.05 to 0.100 inches. Therefore standard ferrules could not be used.

Preferably the ferrules have the following dimensions: the overall thickness of the ferrule is 0.02 inches; for use in a 0.625 inch inner diameter hose the ferrule placed inside the hose has an outer diameter of 0.625 inches; the annular ferrule placed on the outside of the hose end has a diameter of 0.825 inches.

When attaching the couplers, the wall hardness of the still warm hose must be within the range 50 to 75 measured by the durometer. The crimping machine must be adapted to expand the ferrule much more than normal and to squash away the rib. The crimping machine must expand the inner ferrule with the hardened steel collet as depicted in FIG. 10.

The steel collet on insertion has a diameter of 0.535 inches. With the ribbed hose it must be expanded to at least 0.80 inches in order to create an effective seal. Preferably it is expanded to 0.80 inches. Using the crimping machine on a normal hose, it need only be expanded to 0.725 inches. Preferably this crimping Procedure is carried out while the hose is warm and soft as when the hose has been extruded but not allowed to cool to room temperature during its manufacture. Typically, immediately after manufacture the hose is about 110° F.

Alternatively, a partially foamed wall will more readily absorb larger, and therefore even more effective, ribs during crimping.

Users may want to repair damaged hoses by cutting off a defective Part and attaching commercially available "hose menders" which also compress themselves onto the hose wall. Some squash small ribs away, some do not under normal conditions. It is recommended that the user soften the hose in boiling water before attaching the mender.

Furthermore, there are limits to what can be done. The size, number and hardness of the ribs must be limited to what the thickness and softness of the wall can absorb under crimping conditions described.

While specific embodiments of the present invention have been shown and described, it should be apparent that many modifications can be made thereto without departing from the spirit and scope of the invention. Accordingly, the invention is not limited by the foregoing description, but is only limited by the scope of the claims appended thereto.

I claim:

1. A method for attaching a coupling to a hose, comprising the steps of:
    providing one of a flexible plastic and rubber water hose having a wall defined by inner and outer circumferential surfaces, and circumferentially spaced ribs integrally molded with said wall extending from said inner circumferential surface and extending longitudinally to the hose between open ends thereof;
    providing an annular coupling comprising a ferrule and a connector;
    inserting a portion of said connector into said hose and placing said ferrule around said outer circumferential surface of said hose, thereby radially aligning the portion of said connector with said ferrule and said ribs, with said ribs existing between said portion and said ferrule; and
    deforming said ribs with circumferential corrugations of said portion by forcing said corrugations into said ribs, and thereby absorbing said ribs into the wall and sealing said hose against water leakage from between said connector and said wall;
    wherein said providing a hose step includes providing a hose having ribs of a size, number and hardness all limited to what the hose wall thickness and softness can absorb for sealing against said leakage.

2. The method of claim 1 wherein the hose is a garden hose.

3. The method of claim 1 wherein said hose has a wall thickness between about 0.04 inches and about 0.15 inches, an inside diameter between about 0.5 inches and 3 inches excluding rib height, and each of said ribs has a height between about 0.05 and about 0.10 inches and a rib base width between about 0.04 and about 0.125 inches.

4. The method of claim 1 wherein the hose is a garden hose wherein the ribs extend continuously from one end of the hose to the other, said hose has an odd number of ribs between about 5 to about 11 and said hose has an inside diameter between about 0.5 inches and 0.75 inches excluding rib height.

5. The method of claim 1 including attaching said coupling to the end of the hose while said hose is heated.

6. A method for attaching a coupling to a hose, comprising the steps of:
    providing one of a flexible plastic and rubber water hose having a wall defined by inner and outer circumferential surfaces, and circumferentially spaced ribs integrally molded with said wall extending from said inner circumferential surface and extending longitudinally to the hose between open ends thereof;
    providing an annular coupling comprising a ferrule and a connector;
    inserting a portion of said connector into said hose and placing said ferrule around said outer circumferential surface of said hose, thereby radially aligning the portion of said connector with said ferrule and said ribs, with said ribs existing between said portion and said ferrule; and
    inserting a crimping tool into said portion of said connector and operating said crimping tool thereby forming circumferential corrugations into said portion and pressing these corrugations into said ribs and thereby absorbing said ribs into the wall and sealing said hose against water leakage from between said connector and said wall;
    wherein said providing a hose step includes providing a hose having ribs of a size, number and hardness all limited to what the hose wall thickness and softness can absorb for sealing against said leakage.

* * * * *